(12) United States Patent
Yarykin et al.

(10) Patent No.: US 8,990,946 B1
(45) Date of Patent: Mar. 24, 2015

(54) SYSTEM AND METHODS OF DISTRIBUTING ANTIVIRUS CHECKING TASKS AMONG VIRTUAL MACHINES IN A VIRTUAL NETWORK

(71) Applicant: Kaspersky Lab ZAO, Moscow (RU)

(72) Inventors: Pavel N. Yarykin, Moscow (RU); Ilya B. Godunov, Moscow (RU)

(73) Assignee: Kaspersky Lab ZAO (RU)

( * ) Notice: Subject to any disclaimer, the term of this patent is extended or adjusted under 35 U.S.C. 154(b) by 0 days.

(21) Appl. No.: 14/297,885

(22) Filed: Jun. 6, 2014

(30) Foreign Application Priority Data

Apr. 18, 2014 (RU) .................................. 2014115456

(51) Int. Cl.
*G06F 11/30* (2006.01)
*G06F 21/53* (2013.01)
(Continued)

(52) U.S. Cl.
CPC .............. *G06F 21/53* (2013.01); *G06F 21/566* (2013.01); *H04L 63/0272* (2013.01); *G06F 9/45554* (2013.01); *G06F 9/5083* (2013.01); *G06F 21/64* (2013.01); *G06F 21/645* (2013.01); *G06F 9/5055* (2013.01); *G06F 9/45533* (2013.01)
USPC ................................. 726/24; 726/30; 713/188

(58) Field of Classification Search
CPC .............. G06F 9/45558; G06F 9/5055; G06F 9/45545; G06F 9/45554; G06F 9/45533; G06F 9/5083; G06F 21/54; G06F 21/554; G06F 21/53; G06F 21/5561; G06F 21/562; G06F 21/56; G06F 21/566; G06F 21/567; G06F 21/568; G06F 21/64; H04L 63/0272; H04L 63/1416

USPC ........................................ 726/24, 30; 713/188
See application file for complete search history.

(56) References Cited

U.S. PATENT DOCUMENTS

| 7,797,748 | B2 | 9/2010 | Zheng et al. |
| 8,001,606 | B1 * | 8/2011 | Spertus .......................... 726/25 |

(Continued)

FOREIGN PATENT DOCUMENTS

EP         2597569 A1    5/2013

OTHER PUBLICATIONS

Garber, Lee. "The challenges of securing the virtualized environment." Computer 45.1 (2012): 17-20.*

(Continued)

*Primary Examiner* — Michael Simitoski
(74) *Attorney, Agent, or Firm* — Arent Fox LLP; Michael Fainberg

(57) ABSTRACT

Disclosed are methods, systems and computer program products for antivirus checking of software objects in a virtual environment. An example method includes monitoring, by an antivirus agent running on a virtual machine in the virtual environment, one or more events occurring in the virtual machine; determining an object related to the one or more monitored events and a type of the object; determining whether the object needs antivirus checking; sending, to a control module in the virtual environment, information about the object that needs antivirus checking, the type of the object, and the one or more identified events; determining one or more methods of antivirus checking to be performed on the object; selecting one or more components of an antivirus system in the virtual environment; and distributing among the selected components, the antivirus checking methods to be performed on the object.

24 Claims, 4 Drawing Sheets

(51) Int. Cl.
*G06F 21/56* (2013.01)
*H04L 29/06* (2006.01)
*G06F 9/50* (2006.01)
G06F 7/04 (2006.01)
G06F 17/30 (2006.01)
G06F 9/455 (2006.01)
G06F 21/64 (2013.01)

(56) References Cited

U.S. PATENT DOCUMENTS

| | | | |
|---|---|---|---|
| 8,060,577 B1* | 11/2011 | Conrad | 709/216 |
| 8,074,276 B1 | 12/2011 | Beloussov et al. | |
| 8,312,547 B1 | 11/2012 | Sobel et al. | |
| 8,387,046 B1 | 2/2013 | Montague et al. | |
| 8,443,363 B1* | 5/2013 | Brennan et al. | 718/1 |
| 8,443,449 B1* | 5/2013 | Fan et al. | 726/24 |
| 8,621,630 B2* | 12/2013 | Economos et al. | 726/23 |
| 8,650,567 B2 | 2/2014 | Chen et al. | |
| 2006/0136720 A1* | 6/2006 | Armstrong et al. | 713/164 |
| 2007/0160062 A1* | 7/2007 | Morishita et al. | 370/395.31 |
| 2009/0089879 A1* | 4/2009 | Wang et al. | 726/24 |
| 2009/0158432 A1* | 6/2009 | Zheng et al. | 726/24 |
| 2010/0138924 A1 | 6/2010 | Heim et al. | |
| 2010/0306849 A1* | 12/2010 | Zheng et al. | 726/24 |
| 2011/0078799 A1* | 3/2011 | Sahita et al. | 726/26 |
| 2011/0225624 A1* | 9/2011 | Sawhney et al. | 726/1 |
| 2012/0144489 A1 | 6/2012 | Jarrett et al. | |
| 2012/0254993 A1 | 10/2012 | Sallam | |
| 2012/0255018 A1* | 10/2012 | Sallam | 726/24 |
| 2013/0055396 A1* | 2/2013 | Wang et al. | 726/24 |
| 2013/0125125 A1* | 5/2013 | Karino et al. | 718/1 |
| 2013/0139165 A1* | 5/2013 | Doukhvalov et al. | 718/102 |
| 2013/0160125 A1* | 6/2013 | Likhachev et al. | 726/24 |
| 2013/0219495 A1 | 8/2013 | Kulaga et al. | |
| 2013/0275964 A1* | 10/2013 | Edwards et al. | 718/1 |
| 2013/0333042 A1* | 12/2013 | Saika | 726/24 |
| 2014/0096131 A1* | 4/2014 | Sonnek et al. | 718/1 |
| 2014/0304819 A1* | 10/2014 | Ignatchenko et al. | 726/24 |

OTHER PUBLICATIONS

Huijgen, Arris. "Efficiently Protecting Virtualized Desktop Infrastructures Against Malware." (2013).* van Surksum, Kenneth. "Paper: Enabling VMware vShield Endpoint for Horizon View." (2014).*

* cited by examiner

SYSTEM AND METHODS OF DISTRIBUTING ANTIVIRUS CHECKING TASKS AMONG VIRTUAL MACHINES IN A VIRTUAL NETWORK

CROSS-REFERENCE TO RELATED APPLICATIONS

This application claims benefit of priority under 35 U.S.C. 119(a)-(d) to a Russian Application No. 2014115456 filed on Apr. 18, 2014, which is incorporated by reference herein.

FIELD OF TECHNOLOGY

The present disclosure relates generally to the field of computer security, and more specifically, to a system and methods of distributing antivirus checking tasks among components of an antivirus system that reside on different virtual machines.

BACKGROUND

With recent advances in computer technology, the use of virtual machines for different computing task has become very popular. A virtual machine (VM) is a software environment within a physical ("real") machine (such as a computer or server) which provides isolation from each other for the working of programs and even operating systems, including the BIOS, the processor (CPU), the working memory, hard disk and peripherals. Thus, a working of the physical machine inside another physical machine is provided. Furthermore, if the virtual machine as well as the physical machine has its own operating system, this may be different from the operating system of the physical machine. On one physical machine, which is also known as the "host machine", it is possible to create a virtual computer environment which serves several virtual machines at the same time. During operation, the virtual machines use the same computing resources of the host machine, which are controlled by a monitor of the virtual machines.

The monitor of the virtual machines, which is also known as a hypervisor, provides for the simultaneous and parallel working of the virtual machines deployed on the host machine, and also controls the computing resources of the host machine, allocating them among the virtual machines. Thus, the hypervisor assigns a definite quantity of resources to each virtual machine. Each VM then uses the assigned resources, both for the working of its own operating system and for the performance of user tasks. Moreover, the hypervisor may provide communication and interworking services for the virtual machines, such as network connections, as if they were different physical machines. Thus, it is possible to create a virtual local-area network on the host machine. The capabilities of the hypervisor also make it possible to impose various limitations on the virtual machines, such as a limitation on connecting to the Internet. In this case, a local-area network is formed that is isolated from the external network. For example, this allows one to ensure the security of such a network or the virtual machines, and the connection to the external network is done through the hypervisor or a specially dedicated VM. This variant is helpful for the creation of corporate networks whose virtual machines might hold confidential information.

Moreover, a virtual machine, like any other physical computer system, is also vulnerable to malicious software. Consequently, there is a need for an antivirus system to protect them. Such a problem may be solved by launching traditional antivirus software on each virtual machine. But at the same time, this approach also has a major shortcoming when realized in a virtual environment formed on a host machine. The shortcoming is due to the excessive utilization of the resources of the host machine, which may result in an overloading of the host machine or a prolonged freezing of the VM when performing tasks on VM data. This shortcoming is due to the fact that a situation may arise when the antivirus systems is checking a file that physically resides in the same sector of the hard disk of the host machine, e.g., the identical file is checked. Moreover, the hypervisor has another workload involving the providing of resources (such as processor and memory resources) for the working of the antivirus system on each VM. Yet another shortcoming lies in the fact that the antivirus system installed in the operating system of the virtual machine is a classical kind, and therefore it knows nothing about the hypervisor and it is unable to utilize the services of the virtual machine when necessary, for example, for carrying out the "rollback" function or for the creation of a picture of the file system.

An analysis of the prior art shows that the previous technologies are ineffective and in certain cases cannot be used.

SUMMARY

Some present aspects reduce the workload on the computing resources of a host machine by distributing the antivirus checking tasks among components of the antivirus system that are residing on different virtual machines.

In one aspect, an example method of antivirus checking of software objects in a virtual environment is provided that includes monitoring, by an antivirus agent running on a virtual machine in the virtual environment, one or more events occurring in the virtual machine; determining, by the antivirus agent, an object related to the one or more monitored events and a type of the object; determining, by the antivirus agent and based on the type of the object, whether the object needs antivirus checking; sending, by the antivirus agent, to a control module in the virtual environment, information about the object that needs antivirus checking, the type of the object, and the one or more identified events; determining, by the control module and based on the information received from the antivirus agent, one or more methods of antivirus checking to be performed on the object; selecting, by the control module, one or more components of an antivirus system in the virtual environment, in a security virtual machine, in an external component of the virtual environment, or in the antivirus agent in the virtual machine, to perform the one or more antivirus checking methods; and distributing, by the control module, among the one or more selected components, the one or more antivirus checking methods to be performed on the object.

In one aspect, the components of the antivirus system in the virtual environment perform difference types of the antivirus checking methods.

In another aspect, the method further includes, prior to distributing the one or more antivirus checking methods among the one or more components, determining, by the control module or the security virtual machine, priorities of execution of the one or more methods of antivirus checking; and forming a queue for execution of the one or more antivirus checking methods, by the security virtual machine and based on the priorities of execution.

In another aspect, the method further includes, upon forming a queue for execution of the one or more antivirus checking methods, determining times of execution of the one or more antivirus checking methods, wherein the times of execution define successive execution, execution delay by a particular time, or parallel execution.

In another aspect, the one or more components are selected at least partially based on workload of computing resources of the virtual machine and the security virtual machine.

In another aspect, the priorities of execution of the one or more methods of antivirus checking are based on one or more of resource intensities of the one or more methods of antivirus checking, times of performance of the one or more methods of antivirus checking, and effectiveness of the one or more methods of antivirus checking.

In another aspect, the external component of the virtual environment is an external server that is connected to the virtual environment via the Internet.

In another aspect, the one or more components are selected based at least partially on an availability of a functional in the virtual machine, in the security virtual machine, or in the external component, wherein the functional is responsible for performing the one or more antivirus checking methods.

In another aspect, an example system of antivirus checking of software objects in a virtual environment is provided that includes a processor configured to execute an antivirus agent on a virtual machine in a virtual environment, the processor being further configured to monitor, by the antivirus agent, one or more events occurring in the virtual machine; determine, by the antivirus agent, an object related to the one or more monitored events and a type of the object; determine, by the antivirus agent and based on the type of the object, whether the object needs antivirus checking; send, by the antivirus agent, to a control module in the virtual environment, information about the object that needs antivirus checking, the type of the object, and the one or more identified events; determine, by the control module and based on the information received from the antivirus agent, one or more methods of antivirus checking to be performed on the object; select, by the control module, one or more components of an antivirus system in the virtual environment, in a security virtual machine, in an external component of the virtual environment, or in the antivirus agent in the virtual machine, to perform the one or more antivirus checking methods; and distribute, by the control module, among the one or more selected components, the one or more antivirus checking methods to be performed on the object.

In a further aspect, an example computer program product stored on a non-transitory computer-readable storage medium is provided that includes computer-executable instructions for antivirus checking of software objects in a virtual environment, including instructions for monitoring, by an antivirus agent running on a virtual machine in the virtual environment executed by a processor, one or more events occurring in the virtual machine; determining, by the antivirus agent, an object related to the one or more monitored events and a type of the object; determining, by the antivirus agent and based on the type of the object, whether the object needs antivirus checking; sending, by the antivirus agent, to a control module in the virtual environment, information about the object that needs antivirus checking, the type of the object, and the one or more identified events; determining, by the control module and based on the information received from the antivirus agent, one or more methods of antivirus checking to be performed on the object; selecting, by the control module, one or more components of an antivirus system in the virtual environment, in a security virtual machine, in an external component of the virtual environment, or in the antivirus agent in the virtual machine, to perform the one or more antivirus checking methods; and distributing, by the control module, among the one or more selected components, the one or more antivirus checking methods to be performed on the object.

The technical result of the present disclosure includes reducing the workload on the computing resources of a host machine where a virtual environment has been deployed, consisting at least of two virtual machines, during the performance of an antivirus check on at least one of these virtual machines. The technical result of the present disclosure is achieved by distributing the antivirus checking task among components of the antivirus protection modules that are residing on different virtual machines in said virtual environment.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for distributing antivirus checking tasks among components of an antivirus system that reside on different virtual machines. Accordingly, some present aspect solve the shortcomings of the prior art described herein, namely, the delegating of antivirus checking tasks among components of an antivirus system depending on the conditions for performing the antivirus check. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
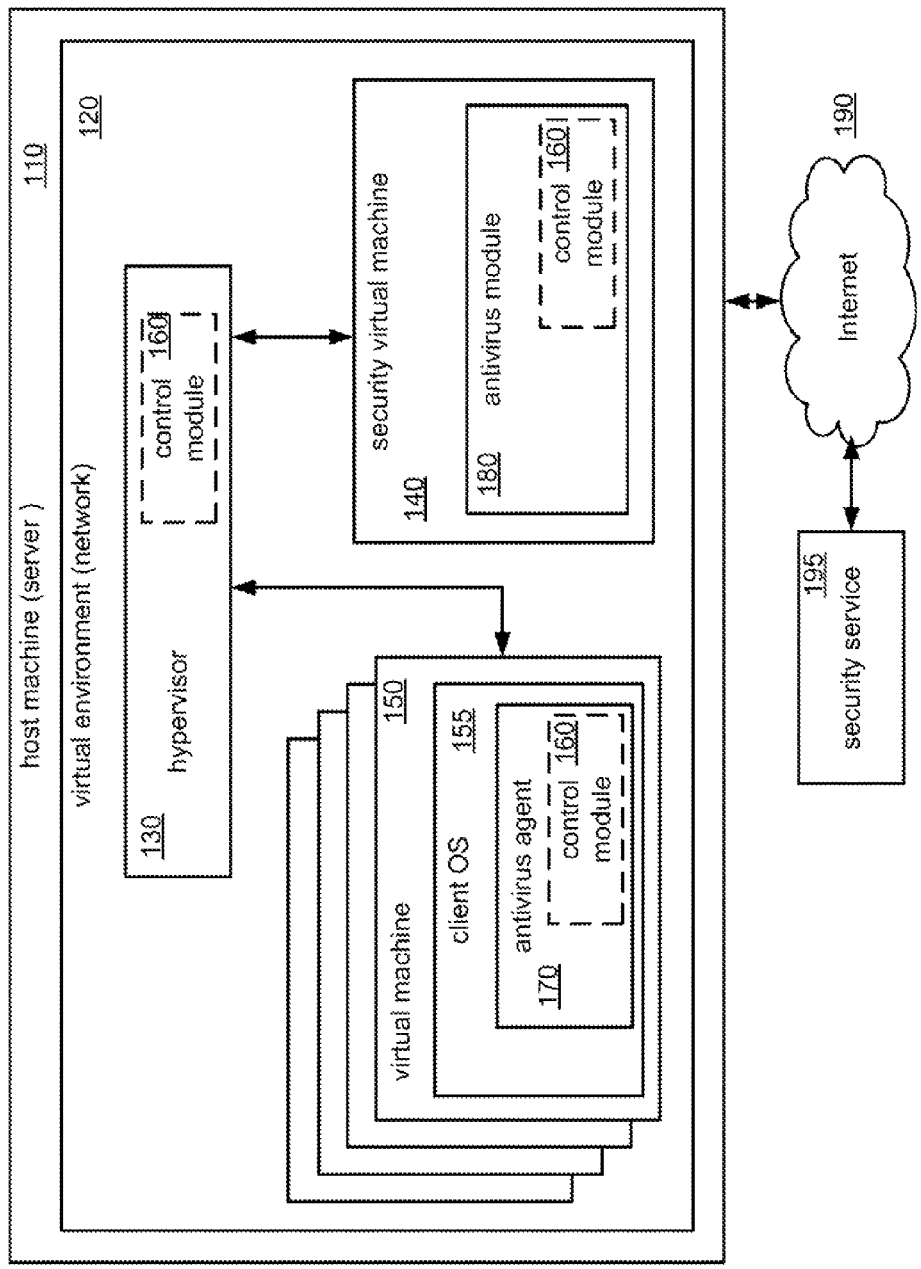
FIG. 1 shows an example of a virtual network architecture for which one present aspect is implemented, and an example of the location of the components of the antivirus system.

FIG. 1 shows a virtual environment which is deployed on a host machine 110. In the present disclosure, the term host machine 110 may mean a cluster of servers, a server or a computer having sufficient computing resources for deployment of the virtual environment 120, including several dozens (if not more) of virtual machines (VMs) 150. In one aspect, the virtual environment 120 may be a corporate (local-area) network, such as a so-called "Intranet", which includes a set of VMs 150. Each VM 150 is designed to launch thereon a guest operating system (client OS) 155, which may be needed both for the working of the users and for the file servers or web servers. The client OS 155 may be different (such as Microsoft Windows, Linux, Mac OS) on each VM 150 depending on the needs of each user of the particular VM 150. Furthermore, the VM 150 may be similar to a personal computer or also a mobile device, such as a notebook or smartphone. Therefore, the hardware needed for the working of each VM 150 may also be different. By hardware is meant the group of allocated resources (memory volume, hard disk size, number of processor kernels, number of processors, and so on) of the host machine 110.

In one aspect, to enable a simultaneous working of the VMs 150 the host machine 110 includes a hypervisor 130. The hypervisor 130 is designed to provide isolation of one VM 150 from another VM 150, control (regulation) of the computing resources of the host machine 110 and allocation of the given computing resources among the VMs 150. Regulation of the computing resources makes possible a working of VMs 150 without freezing or delays, since the VMs 150 utilize the identical computing resources of the host machine 110. For example, in the case of a simultaneous working of several VMs 150 with a data storage medium (such as a hard disk drive (HDD)), it is necessary to form a queue for access to the hypervisor 130. This is because, even though special sectors on the hard disk have been allocated to each VM 150, the data input/output operations occur using the identical element (such as a disk head).

Yet another example of the regulation of the workload is the working of the virtual machines 150 with the processor of the host machine 110. When the virtual machines are launched, each VM 150 may be assigned a percentage utilization of the capabilities of the physical process of the host machine 110, for example, 25% for one VM, and 50% for another VM. The hypervisor 130 is necessary to regulate the processor workload of each VM 150 when they are jointly working. For example, if the first VM loads the processor by 10%, then the second VM has the ability to load it up to 40%. The principle for regulating the processor resources of the host machine 110 among the VMs may be different and may depend on various criteria, for example, the prioritization of the VM or the initial settings of each VM.

Furthermore, the hypervisor 130 also provides communication and interaction between the VMs 150 as if the VMs 150 were physical machines. In FIG. 1 the hypervisor 130 resides at the level of the virtual environment 120 in order to simplify the comprehension of the present aspects, although it is generally placed at the level of the kernel of the host machine 110. Moreover, the hypervisor 130 may also control access to an external network 190, such as the Internet. Therefore, the virtual machines 150 when necessary have the ability of interacting through the hypervisor 130 with external servers and services, for example, for the user to work remotely or to download necessary updates for applications installed in the client OS 155. An example of a service is the security service of an antivirus company 195, which is designed to provide updates for the antivirus system and various information, such as news about malicious file. The interactions occur through the hypervisor 130.

The protection of the virtual environment 120 against various harmful programs and applications is provided by the antivirus system, which in FIG. 1 is presented in the form of several components distributed among the VMs 150. One component of the antivirus system resides directly in the client OS 155, namely, the antivirus agent 170, one of the purposes of which is to monitor in real time the events occurring in the client OS 155. An example of such events might be system calls, read, write, file opening and closing operations. By monitoring is meant the identification, among the events occurring, of a forbidden event and the subsequent blocking of both the forbidden event itself and the object giving rise to the forbidden event. A list of forbidden events or forbidden objects is transmitted from the antivirus module 180. Furthermore, the antivirus agent 170 is able to perform an antivirus check by itself. In this case, the antivirus agent 170 has a functional which enables said antivirus check (which is described herein with reference to FIG. 2).

A second component of the antivirus system resides on the security virtual machine 140 (hereinafter, the SVM 140), which is specially created for the working of the antivirus system and which includes the antivirus module 180, which in turn is designed to perform the tasks of the antivirus check. The SVM 140 is similar to VM 150, but its purpose, as mentioned above, is to perform the tasks of antivirus checking. The creation of such a SVM 140 makes it possible to unload of VMs 150 from performing some of the resource-consuming operations (e.g., antivirus check methods) when performing the antivirus checking tasks from the VM 150, which allows for a reduced workload both on the VMs 150 themselves and on the host machine 110. For example, the transfer to the SVM 140 of such an antivirus check method as signature analysis of files substantially reduces the workload on the resources of the host machine 110, in particular, it decreases the number of disk operations (work with the hard disk) and the use of memory. This is due to the fact that a constant accessing of the signature list is needed during the performance of a signature analysis, but since this method is performed only by the SVM 140, the accessing of the hard disk also occurs from the SVM 140. Yet another aspect is due to the fact that signature analysis takes time, which may result in substantial delay in the user's work.

Furthermore, the antivirus agent 170 and the antivirus module 180 may include a functional making possible both a simpler type of antivirus check (for example, a signature analysis of files based on a hash sum comparison) and a more complicated, allowing for a more detailed analysis (for example, by using an expert system based on an analysis of events which have occurred). The functional of each component depends on the settings of the antivirus system, which is generally done when implementing this system in the virtual environment 120 and when installing the antivirus agent 170 on each VM 150. During the setup, one uses a criterion such as the functional capability of the VM 150. In other words, the parameters of the computing resources of the host machine 110 which have been allocated to the VM 150. Therefore, the functionality of the components may either be different from each other or similar. Sample aspects of the structure of the antivirus agent and the antivirus module, as well as their purposes and the interactions between them, are examined in greater detail herein with reference to FIG. 2. The functional of each component may change over time, for example, due to a change in the number of computing resources of the host machine 110 allocated to the virtual machines 140 and 150.

The last component of the antivirus system is the control module 160. The control module 160 is designed to process information arriving from each antivirus agent 170. By information is meant requests to perform an antivirus check or intercept a suspicious event. After this, the control module 160 determines at least one necessary method of antivirus checking and at least one component of the antivirus system (170 or 180) that are used to perform said antivirus check. Besides the mentioned components 170 and 180, a request to perform an antivirus check may also be sent to any given external component via the Internet 190, for example, to the security service 195, which performs the analysis and provide to the control module 160 the results of the check. An example of a security service 195 is the KSN (or Kaspersky security network) service, provided by the antivirus company "Kaspersky Lab ZAO". The control module 160 may reside in any desired place in the virtual environment 120. For example, as shown in FIG. 1, the place of residence may be the hypervisor 130, the antivirus module 180 or the antivirus agent 170. The specific place of residence depends on the required implementation of the present aspects and the capabilities of the host machine 110. In one aspect of the present disclosure, the control module 160 may also be distributed, for example, one part resides on the hypervisor 130, another part on the antivirus agent 170. Hereafter, it is assumed that the place of residence of the control module 160 is the hypervisor 170. Residing on the hypervisor 160 allows the control module 160 to receive information more quickly as to the working of the components (the antivirus agent 170 and the antivirus module 180) residing on the VM 150 and the VM 140 and to distribute the antivirus checking tasks among the components to be performed on an object.

Figure 2:
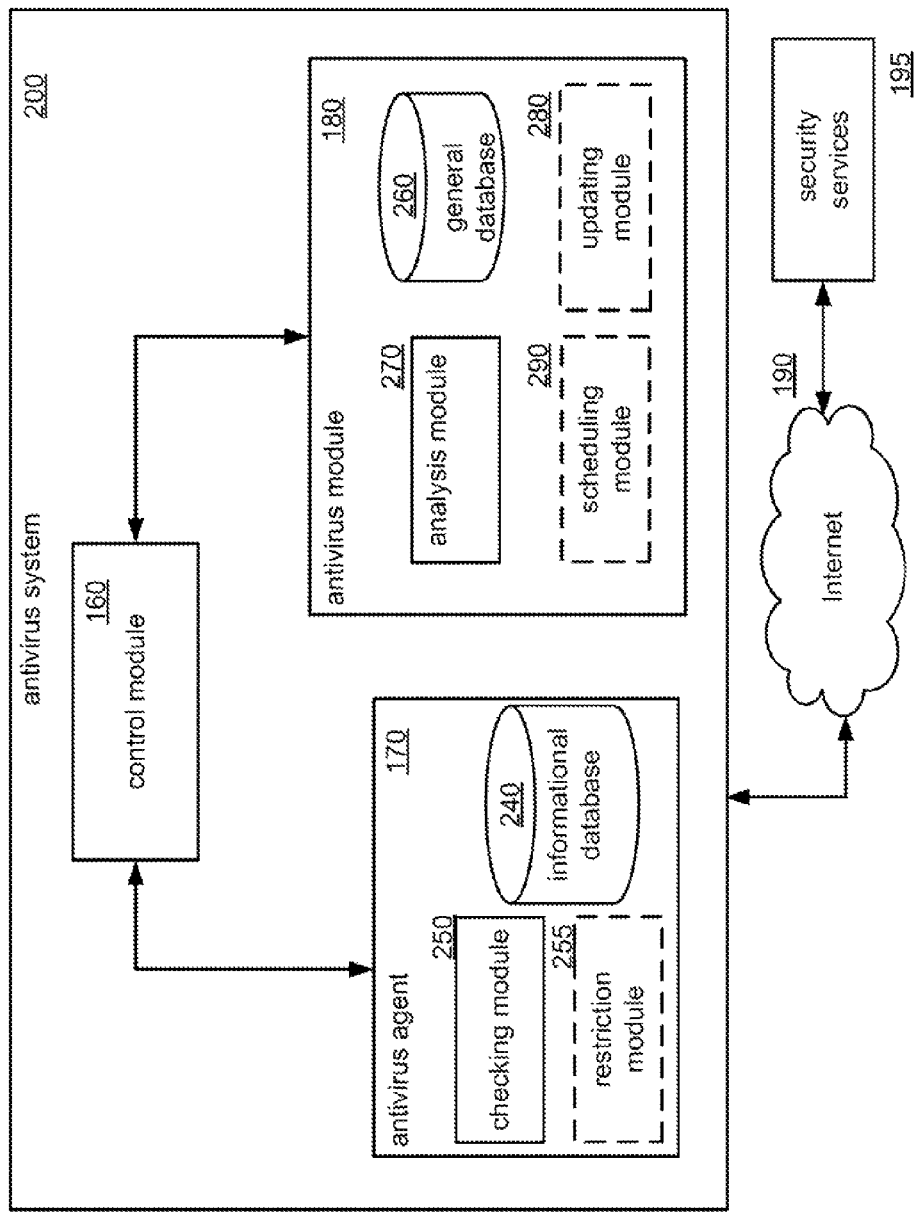
FIG. 2 illustrates a structural diagram of an example system for distributing the antivirus checking tasks among the components of the antivirus system residing on different virtual machines of the virtual environment.

FIG. 2 shows a structural diagram of the system for distribution of the antivirus checking task among components of the antivirus system residing on different virtual machines of the virtual environment.

The antivirus system 200 is an antivirus protection system (mentioned in FIG. 1) of the virtual machines (VMs) 150. In one aspect, the VMs 150 are combined into a local-area (corporate) network. A special feature of the given antivirus system 200 as compared to modern antivirus systems is that it allows a decreasing of the workload on the computing resources of the host machine 110 and an increasing of the speed of performing the antivirus check, thanks to the distribution (delegation) of the antivirus checking task among components of the antivirus system residing on different VMs 150, and control of access to the computing resources of the host machine 110.

In one aspect, the antivirus system 200 consists of a control module 160, at least one antivirus agent 170 and an antivirus module 180. In one aspect, the antivirus agent 170 includes an informational database 240 and a checking module 250 to perform its purpose. The informational database 240 is designed to store the necessary information for the working of the antivirus agent 160 and, in particular, the checking module 250. Examples of information might be at least information about the types of files, lists of trusted and untrusted applications, heuristic rules (such as event analysis rules) and information on the results of previous checks. The checking module 250 is designed to perform an analysis of events and objects in order to determine the harmfulness of the objects by the antivirus check methods that were installed during the deployment of the antivirus agent 170 on the VM 150. A list of the methods of antivirus checking are discussed below.

In one aspect, the antivirus agent 170 also includes a restriction module 255, which in turn is designed to monitor events occurring and actions being performed in the client OS 155. By monitoring is meant the identification of suspicious events among the events occurring and the restriction (blocking) of the events occurring according to specified parameters. By parameters is meant various monitoring rules that have been assigned to the antivirus agent 170 by the control module 160 or the checking module 250.

The antivirus module 180 in turn includes a general database 260 and analysis module 270. The general database 260 is designed to store any given information designed for the working of the antivirus module 230 and its components. An example of the information is a list of signatures of malicious files and applications, a list of metadata, lists of monitoring or analysis rules, or a list of already verified objects (a certain centralized data cache) included in the VM 150. The analysis module 270 is designed to perform an antivirus check using the antivirus check methods installed in the given module 270.

In one aspect, the antivirus module 180 also includes an updating module 280 and a scheduling module 290. The updating module 280 is designed for automatic updating of the informational database. For this, the updating module 280 is connected to an external updating service (for example, the security service 195) via the Internet 190 and interacts with it to obtain the necessary information. Since the present aspects work in a virtual environment, the connection to the Internet 190 occurs through the hypervisor 130. The scheduling module 290 is designed to schedule the performance of the antivirus check by the analysis module 270 in the event of receiving more than one task to perform an antivirus check from the control module 160 or in the event of performing the antivirus check by different antivirus check methods. Moreover, since the antivirus module 180 may interact at the same time with more than one VM 150, the scheduling module 290 makes it possible to prioritize the antivirus checking tasks from several VMs 150 and forms a check queue.

The antivirus check methods of the checking module 250 and the analysis module 270 may be any contemporary and known approaches to performing a checking of objects for the presence of harmful code. By harmful code (or harmful software) is meant actions which are designed to obtain unauthorized access to the resources of a computer (the host machine 110 or any given VM 150) or information being kept in a computer. Such methods may also be various checking approaches, such as checking of applications with the aid of previously assigned monitoring rules. Examples of the approaches are:

signature analysis;

analysis based on comparing the hash values of an object being analyzed and the hash values of objects known to be harmful;

analysis of an object on the basis of a journal of events including the events occurring during the emulation of the object's code;

analysis of an object with the use of a "sandbox", based on an analysis of the execution of the object in a restricted environment;

analysis of system events during the execution of an object's code by comparing them with events characteristic of harmful behavior, such as creating an entry in the "autostart" folder without the user's knowledge;

analysis with the aid of an expert evaluation, which involves a multilateral evaluation of the parameters as a whole (both direct evaluation of an object and evaluation of its behavior, e.g., analysis of its actions during its execution);

monitoring of applications with the aid of predetermined rules including search terms for forbidden actions and criteria for their restriction, for example, blocking the working of the application.

In different aspects, the checking module 250 and the analysis module 270 may include some or all of the above-enumerated methods of antivirus checking. The list of check methods on the modules 250 and 270 depends on the original setup of these modules. And the setup is based on an analysis of the functionality of each VM 150 and the entire host machine 110. For example, while installing an antivirus agent 220 on the VM 150 it was determined that this VM 150 does not have access to the external network 190, so it does not make sense to provide a functional including methods which describe the monitoring and analysis of network traffic as an antivirus agent 170, residing on this VM 150. Another example is the situation when the VM 150 is limited in computing resources, such as memory, so it does not make sense for it to include a large volume of information, such as a database including the signatures of harmful objects or a functional responsible for the method of analysis by comparing signatures.

Let us now consider a working scenario of the present aspects. Each antivirus agent 170 (hereinafter, agent 170) performs a monitoring of the events taking place in the client OS 155. An example of occurring events are events of opening/closing a file, consulting a register, writing to a file, library startup, and so on. In some aspects, the monitoring is performed to identify the events occurring. In one particular case, the monitoring may be done to identify only certain events, such as those which are suspicious, a list of which has been previously drawn up. Then the agent 170 determines, for each identified event, an object related to the one or more monitored events, e.g., the object which performed the given event, or the object to which the identified event was sent. By object is meant at least a file, a process occurring at the time of execution of a file, or a link pointing to a particular object in the Internet. If the object is a file, it is physically located on a data medium of the host machine 110, and when consulting it from several virtual machines 150 a delay is created when working with it. In one particular case, the file may also be located on an outside host machine, which may lead to even greater delays involving access to the file via a network, such as the Internet 190. After determining the object, the agent 170 performs a primary analysis of that object in order to determine its type. To determine the type of the object, the agent 170 may use the informational database 240, which includes a list of possible types of objects. In one example aspect, the informational database 240 may include a list of not all types of objects, but, for example, the first one hundred of the most popular types. Then one of the types is the unknown object. After determining the type of the object, the agent 170 sends to the control module 160 information about the object, which includes at least information about the type of the object and the identified event. Moreover, the information sent may also include information on the location of the given object on the data medium (for example, a hard disk) of the host machine 110 and metadata of the object (for example, the size, name, identifier).

The control module 160 determines whether the object needs antivirus checking based on the type of the object. For example, the control module 160, in accordance with the information received, especially on the type of the object and the identified event, determines the need to perform an anti-virus check and the depth of the needed antivirus check. Since not all types of objects are subject to infection by the harmful code or are not a kind of container for the movement of the harmful code, these types are not subjected to further checking. Examples of the most common types of objects which need to be checked are executable files, file scenarios, "Internet" files (web files), compressed files (archives) and text files (documents). This information is also stored in the informational database 240. The depth of the antivirus check, however, is dictated by the identified type of event. For example, if an event has occurred which indicates the starting of a file which has a digital signature of a developer company, then the antivirus check may be superficial or deferred, for example, making use of a list of "white" objects. If an entry has been made in the header of an executable file, such an event requires careful checking, if possible by different methods of antivirus checking.

In one particular aspect, the function of determining the need for performing antivirus checking of an object may be done by the agent 170. The agent 170 then sends information to the control module 160 only about objects for which the antivirus check needs to be performed.

Let us assume that the control module 160 has determined the need to perform an antivirus check of an identified event and, accordingly, a determined object. The control module 160 then formulates the task of performing an antivirus check. In turn, the task includes information on which anti-virus check methods are needed to perform the check and by which components of the antivirus system 200. Depending on the type of object and occurring events involving that object, the control module 160 determines which methods are needed to perform the check, and how quickly.

The determination of the methods of the antivirus check takes into account at least such parameters as the type of object, the necessary time to perform the antivirus check method and the probable delay caused for the user. For example, the object is a compressed file (archive). Consequently, the control module 160 determines that this object may be checked by two methods: a request to an external server via the Internet 190 and a checking by the signature analysis method.

Another example is the situation when the object is a link to an external resource, such as the site "http://msdn.microsoft.com/en-gb/". In this case, the speed of the check needs to be high (so as not to slow down the work of the user, for example). In this case, the control module 160 selects one or more of the following methods: the methods of checking by "whitelists" and "blacklists", the methods of checking using a data cache storing previously verified and most popular objects, and the method of checking via a request to an external security server via the Internet 190. Furthermore, the control module 160 determines the methods which is used while the user is working on the identified site, since there is a probability that new objects may appear.

Yet another example is the situation when the object is an executable file (application). In this case, the control module 160 may determine the need to perform an antivirus check with the aid of the following methods: request to a security service 195 via the Internet 190, emulation of the source code, signature analysis or formulation of a task for the restriction module 255 to check the application using the monitoring rules. In other words, the control module 160 needs to delegate the task of monitoring the execution of the application to the restriction module 255, residing on the antivirus agent 170, delegate the task of a request to the service 195 to the checking module 250, for example, and the tasks of emulation and signature analysis or heuristic analysis to the analysis module 270. Furthermore, the indicated methods of antivirus checking may be performed either deferred in time or at the same time.

In one particular aspect, the task of the antivirus check includes all possible methods of antivirus checking.

After determining the methods of the antivirus check, the control module 160 prioritizes them. Prioritization of the methods of the antivirus check also enables a reduced volume of necessary resources and less time to perform the check. To designate the priorities for the methods of the antivirus check, the control module 160 uses at least two prioritization criteria, namely, the resource intensity and the time of performance of each antivirus check method. By resource intensity is meant which computing resources of the host machine 110 are needed to carry out the corresponding antivirus check method and what workload is placed on the given resources. Examples of necessary resources are at least the processor, the working memory, the permanent memory (in other words, space on the hard disk) and the traffic capacity of the network. By time is meant the time for performance of each method of antivirus checking, also including the time needed for data entry/output when accessing the hard disk of the host machine 110 or the time needed to exchange data on the network, for example, with the security service 195.

In one particular aspect, yet another criterion for prioritization is the effectiveness and reliability of each method of antivirus check. By effectiveness is meant the speed of performance of the antivirus check method along with the level of detection. The level of detection is the percentage of false alarm to a true verdict delivered by the methods.

After establishing the priorities for the methods, the control module 160 forms a queue of the selected methods of antivirus check that perform the task of the antivirus check. A priority is formed according to the following criteria: the fewer resources and the less time spent on carrying out the corresponding check method and the greater the effectiveness of the antivirus check method, the higher the priority. For example, two check methods have been determined: request to a security service 195 and the method of checking with the aid of a signature analysis. The signature analysis requires continual accessing of the hard disk of the host machine 110 to check files and, consequently, it uses a labor-intensive operation of data entry/output from the hard disk, which also influences the productivity of the other VMs 150. However, the request to the security service 195 requires minimal resource costs and, further, the speed of a response to the request is high. Consequently, the priority for the method of checking by a request is higher than that for the method of checking by signatures.

In one particular aspect of the present disclosure, the control module 160 may include in advance a list of priorities, which in turn includes information regarding the level of priority of each method of checking. Moreover, the control module 160 performs a periodic review of the priorities of the antivirus check methods. For example, the Internet speed has decreased, and consequently the priority of the check method by request to the security service 195 decreases.

The control module 160 then determines which component (170 or 180) needs to perform the selected methods of the antivirus check. The choice of the components is based on at least the following conditions: the presence of a functional in the component responsible for performing the corresponding antivirus check method, the workloads of the VMs 150 or the SVM 140 including the components of the antivirus system 200 that are performing the corresponding methods of the antivirus check, and the resource intensities of the selected methods. In one particular aspect, the presence of access to an external network 190 may be yet another condition.

Since the functional responsible for performing a particular method of antivirus check was formulated immediately when installing the components (the agents 170 and the antivirus module 180) on the corresponding virtual machines, the control module 160 has full information on the capabilities of the components.

The control module 160 obtains information as to the workload of the VMs 150 and, consequently, the workload of the components 170 and 180 from the hypervisor 130, since the hypervisor 130 controls the computing resources and the interconnection of the VMs 150 with each other.

In keeping with the conditions, the control module 160 selects a component or components to which the antivirus checking task is delegated. By delegation is meant the sending of requirements to perform the selected methods of the antivirus check to the components of the antivirus system 200, specifically, to the antivirus agent 170 that sent the information to the control module 160, and the antivirus module 180.

In a particular aspect, the component to which the task is sent of carrying out the antivirus check may be the security service 195 or any other agent 170 contained in the virtual environment 120. This is due to the fact that the agent 170 which made the request to perform an antivirus check or the antivirus module 180 has limitations in computing resources, which affects the speed of performance of the antivirus checking tasks. The limitations may be related, for example, to overloading of the VM 150 on which that agent 170 resides, or the SVM 140. In other words, the VM 150 has a limited volume of computing resources that are needed both for the tasks of the VM 150 itself and for the tasks of the VM client, which affects the performance of the antivirus checking task. Moreover, the SVM 140 which is designed to carry out the labor-intensive tasks of the antivirus check may have, at the moment of the request to perform an antivirus checking task for one VM 150, also a series of antivirus checking tasks that need to be performed with higher priority or at once for other VMs 150. Therefore, the control module 160 may make a decision to send the antivirus checking task to the agent 170 of another virtual machine 150 which is idle at that moment or has unused computing resources.

The control module 160 during the distribution of the antivirus checking task, more precisely, the distribution of requests to perform certain antivirus check methods, may send the performance of the methods to any one particular component, as well as to all at once. For example, it has been determined that three check methods need to be implemented, namely, a signature analysis, a checking of an application on the basis of monitoring rules (in other words, application control), and a check based on emulation of the source code. The control module 160 formulates a queue of these according to the prioritization criteria and selects the modules according to the previously described conditions. Consequently, the tasks to perform a signature analysis and a check based on emulation of the source code is sent to the antivirus module 180, while the application check is sent to the antivirus agent 170. Furthermore, if the antivirus module 180 has access to an external network, the scheduling module 290 forms a queue for the performance of these tasks and the signature analysis might be done remotely, instead of by the analysis module 270, i.e., by requesting data on the object under analysis from the external network 190, more precisely, from a remote server. After this, the allocated methods are carried out and the results are sent to the corresponding agent 170 for making a final decision on the harmfulness of the object.

In one particular aspect, the antivirus check methods may be performed either serially, according to a queue assigned by the control module 160, or in parallel. If the methods are performed in parallel, after a decision is made by a particular method and if this decision is sufficient for the agent 170 to make a final decision, the other methods are interrupted and finished (including methods which were delegated for performance to other components of the antivirus system 200).

In yet another particular aspect, the control module 160 while forming the queue of methods may specify the time to begin the performance of each method. For example, to perform one method only upon finishing of another one, or a parallel performance of methods, especially if the methods are performed by different components.

Figure 3:
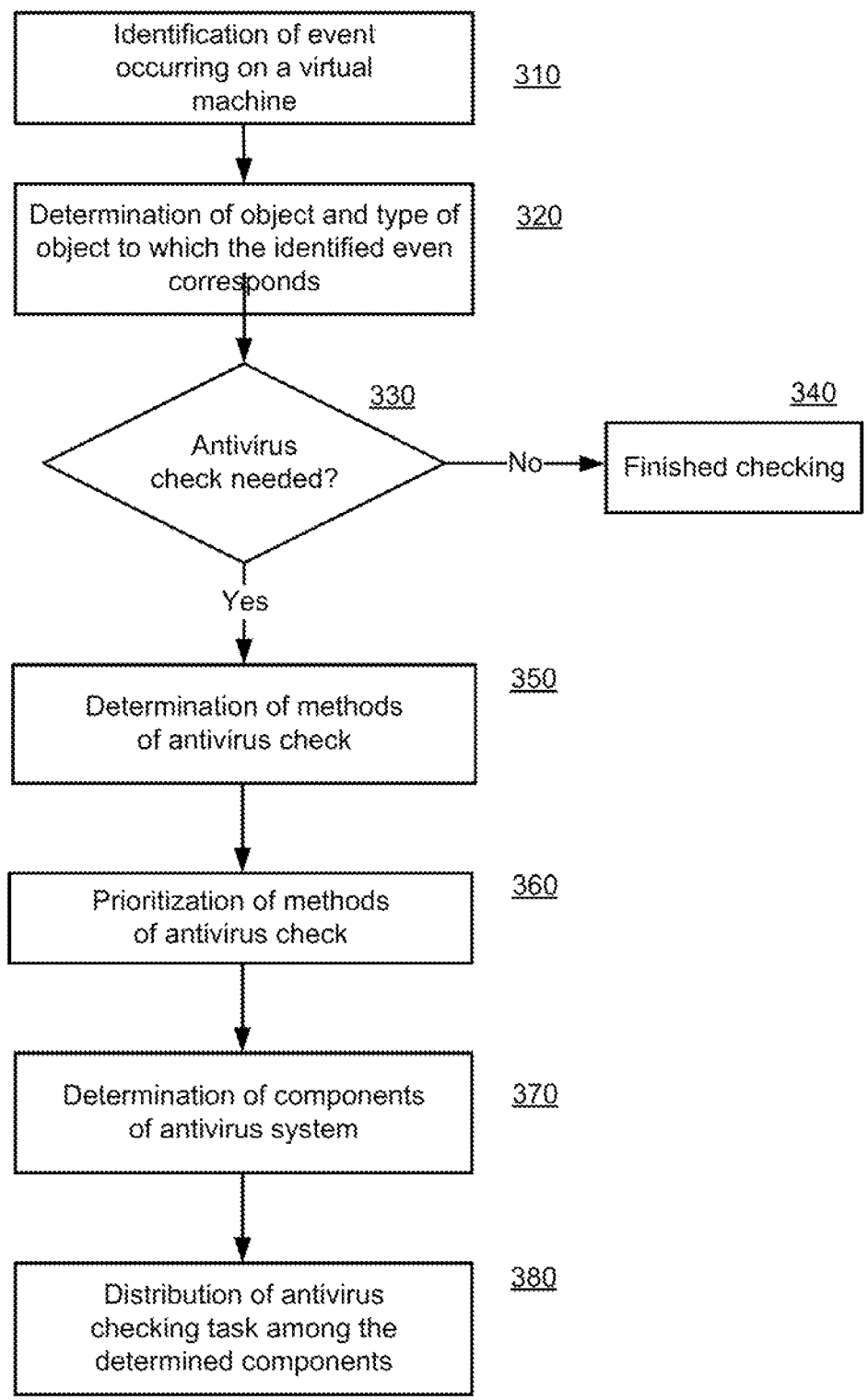
FIG. 3 shows an example aspect of a method distributing the antivirus checking tasks among the components of the antivirus system residing on different virtual machines in the virtual environment.

FIG. 3 shows the algorithm of one particular aspect of the working of the system for distributing antivirus checking tasks among the components of an antivirus system residing on different virtual machines in a virtual environment. In step 310 the antivirus agent 170 on the VM 150 identifies at least one event occurring in the operating system 155 on the given VM 150 residing in the virtual environment 120. After this, the antivirus agent 170 in step 320 determines the object pertaining to the identified event, and with the aid of the informational database 240 it determines the type of said object. By object is meant at least a file, a process occurring in the time of execution of the file, or a hyperlink pointing to a particular object on the Internet.

Depending on the identified type, the antivirus agent 170 at step 330 determines the need to perform an antivirus check for the given object, since not all types of objects might be harmful ones. Examples of types of objects that need to be checked are the following ones: executable files, text files (documents) and files having a "pdf" (portable document format) extension. An example of a type of object not needing to be checked is video files, for example, of DVX format or AVI format. In this case, if the type of object, and in a particular instance also the file format, is that of an object type not needing to be checked, then the working with this file and event is completed in step 340. If the need for a check was determined, the information about the object, its type, and the identified event is sent to the control module 160.

In step 350 the control module 160 determines the methods of antivirus check that are needed to perform the task of the antivirus check. The antivirus check methods are determined on the basis of information provided by the antivirus agent 170. For example, if the information includes a number of different files, it is advisable to perform their checking at least by the method of comparing against a database of signatures of harmful files and a database of signatures of clean files. Such databases may be part of the general database 260. Other methods of checking might also be a check by a data cache including information on the results of previously verified files, and a request to an external analysis module, such as an external server, such as a security service 195, to which one connects via the Internet 190. In the event that the information includes data on a particular application (executable file), two methods may be designated for the given application: the method of emulation and/or the method of analysis based on analysis of events performed by the application during its execution. Furthermore, it is possible to designate all available methods of antivirus checking regardless of what information was received.

Then, in step 360, the control module 160 determines the priority of execution for each specified method of antivirus checking. In some aspects, the priorities of execution of the methods of antivirus checking are based on one or more of resource intensities of the methods of antivirus checking, times of performance of the methods of antivirus checking, and effectiveness of the methods of antivirus checking. Then, in accordance with the assigned priorities, the control module 160 forms a queue for execution of the antivirus check methods. The prioritization is based on a determination of the resource intensity and the time of performance of each method of antivirus check, as well as on the effectiveness of each method of antivirus check. Furthermore, after forming the queue of execution of the methods, the control module 160 may also specify the time of execution of each method, where the times of execution may, for example, define successive execution, execution delay by a particular time, or parallel execution. For example, the control module 160 may specify the time of execution of each method either a performance in succession or with a delay by a particular time, or a parallel performance of the specified methods.

Next, in step 370, the control module makes a selection of components (the antivirus agent 170 on the VM 150 and/or the antivirus module 180 on the SVM 140 and/or an external component of the virtual environment which may be an external server that is connected to the virtual environment via the Internet) of the antivirus system 200 to which the performance of the selected methods of antivirus checking are delegated. In some aspects, the choice is at least partially based on the determination of the presence of a functional responsible for performing the specific method of antivirus check in the components 250 and 270 of the antivirus system 200. In some aspects, the components are selected at least partially based on workload of computing resources of the virtual machine and the security virtual machine.

After this, in step 380, the control module 160 distributes the antivirus check methods among the selected components, which then perform the check that is to be performed on the object. Furthermore, an external component with which an interaction is possible via the external network 190 is a component to which a request may be made to carry out an antivirus check method.

In one particular aspect, the workload of the computing resources of the VMs 150 and 140 on which the components 250 and 270 are installed is also considered in the selection of components.

Figure 4:
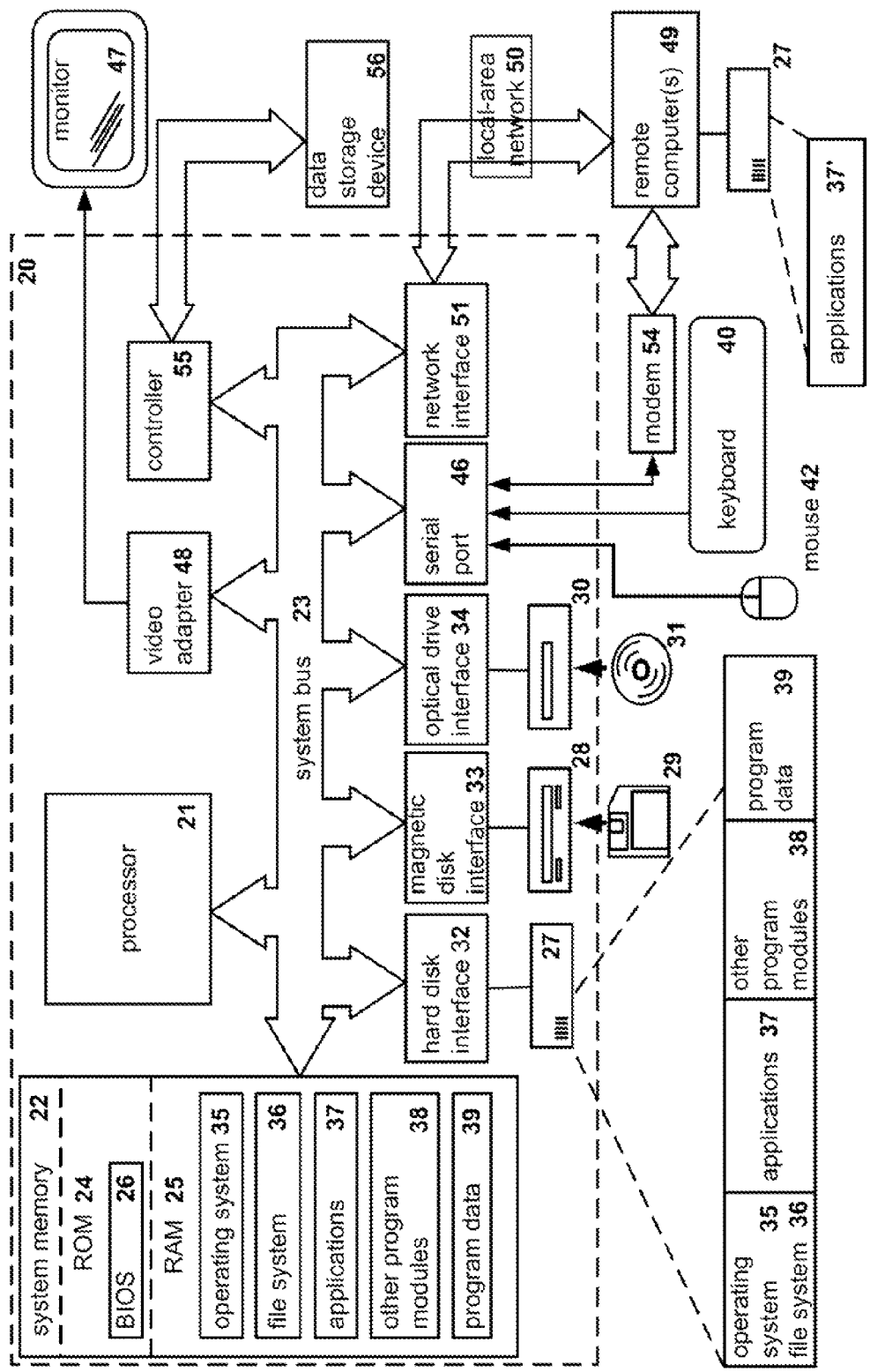
FIG. 4 shows an example of a general-purpose computer system on which the disclosed aspects of system and methods for distributing the antivirus checking tasks among the components of the antivirus system may be implemented.

FIG. 4 shows an example of a general-purpose computer system (which may be a personal computer or a server) 20, including a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) may be used: microphone, joystick, game controller, scanner, and so on. Such input devices usually plug into the computer system 20 through a serial port 46, which in turn is connected to the system bus, but they may be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer may be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 4. Other devices may also be present in the computer network, such as routers, network stations, peer devices or other network nodes.

Network connections may form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 may employ a modem 54 or other modules for providing communications with a wide-area computer network such as the Internet. The modem 54, which is an internal or external device, is connected to the system bus 23 by a serial port 46. The network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium may comprise RAM, ROM, EEPROM, CD-ROM, Flash memory or other types of electric, magnetic, or optical storage medium, or any other medium that may be used to carry or store desired program code in the form of instructions or data structures and that may be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4 above). Accordingly, each module may be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method of antivirus checking of software objects in a virtual environment, comprising:
    monitoring, by an antivirus agent running on a virtual machine in the virtual environment executed by a processor, one or more events occurring in the virtual machine;
    determining, by the antivirus agent, an object related to the one or more monitored events and a type of the object;
    determining, by the antivirus agent and based on the type of the object, whether the object needs an antivirus checking;
    sending, by the antivirus agent, to a control module in the virtual environment, information about the object that needs the antivirus checking, the type of the object, and the one or more monitored events;
    determining, by the control module and based on the information received from the antivirus agent, one or more methods of the antivirus checking to be performed on the object;
    selecting, by the control module, one or more components of an antivirus system in the virtual environment, in a security virtual machine, in an external component of the virtual environment, or in the antivirus agent in the virtual machine, to perform the one or more antivirus checking methods;

determining, by the control module or the security virtual machine, priorities of execution of the one or more methods of antivirus checking; and distributing, by the control module, among the one or more selected components, the one or more antivirus checking methods to be performed on the object based on the priority.

2. The method of claim 1, wherein the components of the antivirus system in the virtual environment perform different types of the antivirus checking methods.

3. The method of claim 1, further comprising:

forming a queue for execution of the one or more antivirus checking methods, by the security virtual machine and based on the priorities of execution.

4. The method of claim 3, further comprising:

upon forming a queue for execution of the one or more antivirus checking methods, determining times of execution of the one or more antivirus checking methods, wherein the times of execution define successive execution, execution delay by a particular time, or parallel execution.

5. The method of claim 3, wherein the priorities of execution of the one or more methods of antivirus checking are based on one or more of resource intensities of the one or more methods of antivirus checking, times of performance of the one or more methods of antivirus checking, and effectiveness of the one or more methods of antivirus checking.

6. The method of claim 1, wherein the one or more components are selected at least partially based on workload of computing resources of the virtual machine and the security virtual machine.

7. The method of claim 1, wherein the external component of the virtual environment is an external server that is connected to the virtual environment via the Internet.

8. The method of claim 1, wherein the one or more components are selected based at least partially on an availability of a functional: in the virtual machine, in the security virtual machine, or in the external component, wherein the functional is responsible for performing the one or more antivirus checking methods.

9. A system of antivirus checking of software objects in a virtual environment, comprising:

a processor configured to execute an antivirus agent on a virtual machine in a virtual environment, the processor being further configured to:

monitor, by the antivirus agent, one or more events occurring in the virtual machine;

determine, by the antivirus agent, an object related to the one or more monitored events and a type of the object;

determine, by the antivirus agent and based on the type of the object, whether the object needs an antivirus checking;

send, by the antivirus agent, to a control module in the virtual environment, information about the object that needs the antivirus checking, the type of the object, and the one or more monitored events;

determine, by the control module and based on the information received from the antivirus agent, one or more methods of the antivirus checking to be performed on the object;

select, by the control module, one or more components of an antivirus system in the virtual environment, in a security virtual machine, in an external component of the virtual environment, or in the antivirus agent in the virtual machine, to perform the one or more antivirus checking methods;

determine, by the control module or the security virtual machine, priorities of execution of the one or more methods of antivirus checking; and distribute, by the control module, among the one or more selected components, the one or more antivirus checking methods to be performed on the object based on the priority.

10. The system of claim 9, wherein the components of the antivirus system in the virtual environment perform different types of the antivirus checking methods.

11. The system of claim 9, wherein the processor is further configured to:

form a queue for execution of the one or more antivirus checking methods, by the security virtual machine and based on the priorities of execution.

12. The system of claim 11, wherein the processor is further configured to:

upon forming a queue for execution of the one or more antivirus checking methods, determine times of execution of the one or more antivirus checking methods, wherein the times of execution define successive execution, execution delay by a particular time, or parallel execution.

13. The system of claim 11, wherein the priorities of execution of the one or more methods of antivirus checking are based on one or more of resource intensities of the one or more methods of antivirus checking, times of performance of the one or more methods of antivirus checking, and effectiveness of the one or more methods of antivirus checking.

14. The system of claim 9, wherein the one or more components are selected at least partially based on workload of computing resources of the virtual machine and the security virtual machine.

15. The system of claim 9, wherein the external component of the virtual environment is an external server that is connected to the virtual environment via the Internet.

16. The system of claim 9, wherein the one or more components are selected based at least partially on an availability of a functional: in the virtual machine, in the security virtual machine, or in the external component, wherein the functional is responsible for performing the one or more antivirus checking methods.

17. A computer program product stored on a non-transitory computer-readable storage medium, the computer program product comprising computer-executable instructions for antivirus checking of software objects in a virtual environment, including instructions for:

monitoring, by an antivirus agent running on a virtual machine in the virtual environment executed by a processor, one or more events occurring in the virtual machine;

determining, by the antivirus agent, an object related to the one or more monitored events and a type of the object;

determining, by the antivirus agent and based on the type of the object, whether the object needs an antivirus checking;

sending, by the antivirus agent, to a control module in the virtual environment, information about the object that needs the antivirus checking, the type of the object, and the one or more monitored events;

determining, by the control module and based on the information received from the antivirus agent, one or more methods of the antivirus checking to be performed on the object;

selecting, by the control module, one or more components of an antivirus system in the virtual environment, in a security virtual machine, in an external component of the virtual environment, or in the antivirus agent in the virtual machine, to perform the one or more antivirus checking methods;

determining, by the control module or the security virtual machine, priorities of execution of the one or more methods of antivirus checking; and distributing, by the control module, among the one or more selected components, the one or more antivirus checking methods to be performed on the object based on the priority.

18. The product of claim 17, wherein the components of the antivirus system in the virtual environment perform different types of the antivirus checking methods.

19. The product of claim 17, further comprising instructions for:

forming a queue for execution of the one or more antivirus checking methods, by the security virtual machine and based on the priorities of execution.

20. The product of claim 19, further comprising instructions for:

upon forming a queue for execution of the one or more antivirus checking methods, determining times of execution of the one or more antivirus checking methods, wherein the times of execution define successive execution, execution delay by a particular time, or parallel execution.

21. The product of claim 19, wherein the one or more components are selected at least partially based on workload of computing resources of the virtual machine and the security virtual machine.

22. The product of claim 19, wherein the priorities of execution of the one or more methods of antivirus checking are based on one or more of resource intensities of the one or more methods of antivirus checking, times of performance of the one or more methods of antivirus checking, and effectiveness of the one or more methods of antivirus checking.

23. The product of claim 19, wherein the external component of the virtual environment is an external server that is connected to the virtual environment via the Internet.

24. The product of claim 19, wherein the one or more components are selected based at least partially on an availability of a functional: in the virtual machine, in the security virtual machine, or in the external component, wherein the functional is responsible for performing the one or more antivirus checking methods.

* * * * *